US012681995B2

(12) United States Patent　　　(10) Patent No.:　US 12,681,995 B2
Goyal et al.　　　(45) Date of Patent:　Jul. 14, 2026

(54) GROUP ACTION FRAMEWORK

(71) Applicant: ServiceNow, Inc., Santa Clara, CA (US)

(72) Inventors: Gaurav Goyal, San Jose, CA (US); Tao Feng, Palo Alto, CA (US); Dariush Shahgoshtasbi, Bellevue, WA (US); Udayan Kumar, Kirkland, WA (US); Manish Kumar Das, Union City, CA (US); Sathish Kumar Gurram, Hayward, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/935,854

(22) Filed: Nov. 4, 2024

(65) Prior Publication Data

US 2026/0127229 A1　　May 7, 2026

(51) Int. Cl.
G06F 16/906　　　(2019.01)
G06F 16/93　　　(2019.01)
G06F 16/9536　　　(2019.01)

(52) U.S. Cl.
CPC ............ G06F 16/906 (2019.01); G06F 16/93 (2019.01); G06F 16/9536 (2019.01)

(58) Field of Classification Search
None
See application file for complete search history.

(56) References Cited

U.S. PATENT DOCUMENTS

| 12,517,938 | B1 * | 1/2026 | Yoon | ................... | G06F 16/3349 |
| 2022/0230113 | A1 * | 7/2022 | Narayan | .......... | G06Q 10/06393 |
| 2025/0088517 | A1 * | 3/2025 | Davraev | ............... | H04W 12/12 |
| 2025/0094628 | A1 * | 3/2025 | McDonnell | .......... | G06F 21/604 |
| 2025/0124059 | A1 * | 4/2025 | Chajewska | ............. | G06F 40/30 |
| 2025/0139140 | A1 * | 5/2025 | Gopalan | ............. | G06F 16/3329 |
| 2025/0173336 | A1 * | 5/2025 | Bakir | ............... | G06F 16/24522 |

OTHER PUBLICATIONS

International Search Report and Written Opinion dated Dec. 19, 2025, from corresponding PCT Patent Application No. PCT/US2025/053269.

* cited by examiner

*Primary Examiner* — Giuseppi Giuliani
(74) *Attorney, Agent, or Firm* — HONIGMAN LLP

(57)　　　ABSTRACT

A method includes obtaining an incident report and assigning an incident type to the incident report. The method also includes determining that the incident type has not been assigned to any prior incident reports and generating a prompt associated with the incident type based on determining that the incident type has not been assigned to any prior incident reports. The method also includes generating a response to the incident report based on the prompt using a large language model (LLM).

19 Claims, 6 Drawing Sheets

GROUP ACTION FRAMEWORK

TECHNICAL FIELD

This disclosure relates to generating recommendations based on data set types.

BACKGROUND

Many entities require the ability to process large volumes of documents and extract relevant information therefrom. For example, some entities need to identify and group similar or related documents, and then perform actions on them, such as summarizing, resolving, recommending, or analyzing the documents. However, developing and maintaining such solutions for multiple different domains or applications can be time-consuming and error-prone, as they may require different data formats, grouping techniques, action outcomes, and domain knowledge. Moreover, existing solutions may not be able to handle diverse and complex data sets or provide customized and context-aware actions.

SUMMARY

One implementation of the disclosure provides a computer-implemented method of using a group action framework. The method includes obtaining an incident report and assigning an incident type to the incident report. The method also includes determining that the incident type has not been assigned to any prior incident reports and generating a prompt associated with the incident type based on determining that the incident type has not been assigned to any prior incident reports. The method also includes generating a response to the incident report based on the prompt using a large language model (LLM).

Implementations of the disclosure may include one or more of the following optional features. In some implementations, the method further includes storing the response for the incident report at a database. In these implementations, determining that the incident type has not been assigned to any prior incident reports may include determining that the database lacks any response associated with the incident type. In some examples, the method further includes obtaining a second incident report and assigning a second incident type to the second incident report. In these examples, the operations may further include determining that the second incident type has been assigned to a particular prior incident report, identifying a second response associated with the second incident type stored at a database based on determining that the second incident type has been assigned to the prior incident report, and retrieving the second response for the second incident report. Here, the second response may be previously generated by the LLM based on the particular prior incident report.

In some implementations, the method further includes extracting data from the incident report. Here, the method may further include determining one or more representative keywords for the incident report based on the extracted data. In these implementations, the operations may further include determining one or more representative incident reports based on the extracted data. The method may further include generating a descriptive prompt based on the extracted data and generating a description for the incident report based on the descriptive prompt using the LLM.

In some examples, the method further includes grouping the obtained incident report with one or more other incident reports each assigned the same incident type as the obtained incident report. In these examples, each incident report in the group of incident reports may include a number of input tokens. Here, obtaining the incident report may include selecting the incident report from the group of incident reports based on the number of input tokens of each incident report. The method may further include generating a respective output using the LLM for each incident report in the group of incident reports and generating a summary based on the respective output generated for each incident report using the LLM.

Another implementation of the disclosure provides a system that includes data processing hardware and memory hardware storing instructions that when executed on the data processing hardware causes the data processing hardware to perform operations. The operations include obtaining an incident report and assigning an incident type to the incident report. The operations also include determining that the incident type has not been assigned to any prior incident reports and generating a prompt associated with the incident type based on determining that the incident type has not been assigned to any prior incident reports. The operations also include generating a response to the incident report based on the prompt using a large language model (LLM).

Implementations of the disclosure may include one or more of the following optional features. In some implementations, the operations further include extracting data from the incident report. Here, the operations may further include determining one or more representative keywords for the incident report based on the extracted data. In these implementations, the operations may further include determining one or more representative incident reports based on the extracted data. The operation may further include generating a descriptive prompt based on the extracted data and generating, using the LLM, a description for the incident report based on the descriptive prompt.

Another implementation of the disclosure provides a computer-readable medium having instructions that, when executed by data processing hardware, causes the data processing hardware to perform operations. The operations include obtaining an incident report and assigning an incident type to the incident report. The operations also include determining that the incident type has not been assigned to any prior incident reports and generating a prompt associated with the incident type based on determining that the incident type has not been assigned to any prior incident reports. The operations also include generating a response to the incident report based on the prompt using a large language model (LLM).

The details of one or more implementations of the disclosure are set forth in the accompanying drawings and the description below. Other implementations, features, and advantages will be apparent from the description and drawings, and from the claims.

DESCRIPTION OF DRAWINGS

Like reference symbols in the various drawings indicate like elements.

DETAILED DESCRIPTION

Figure 1A:
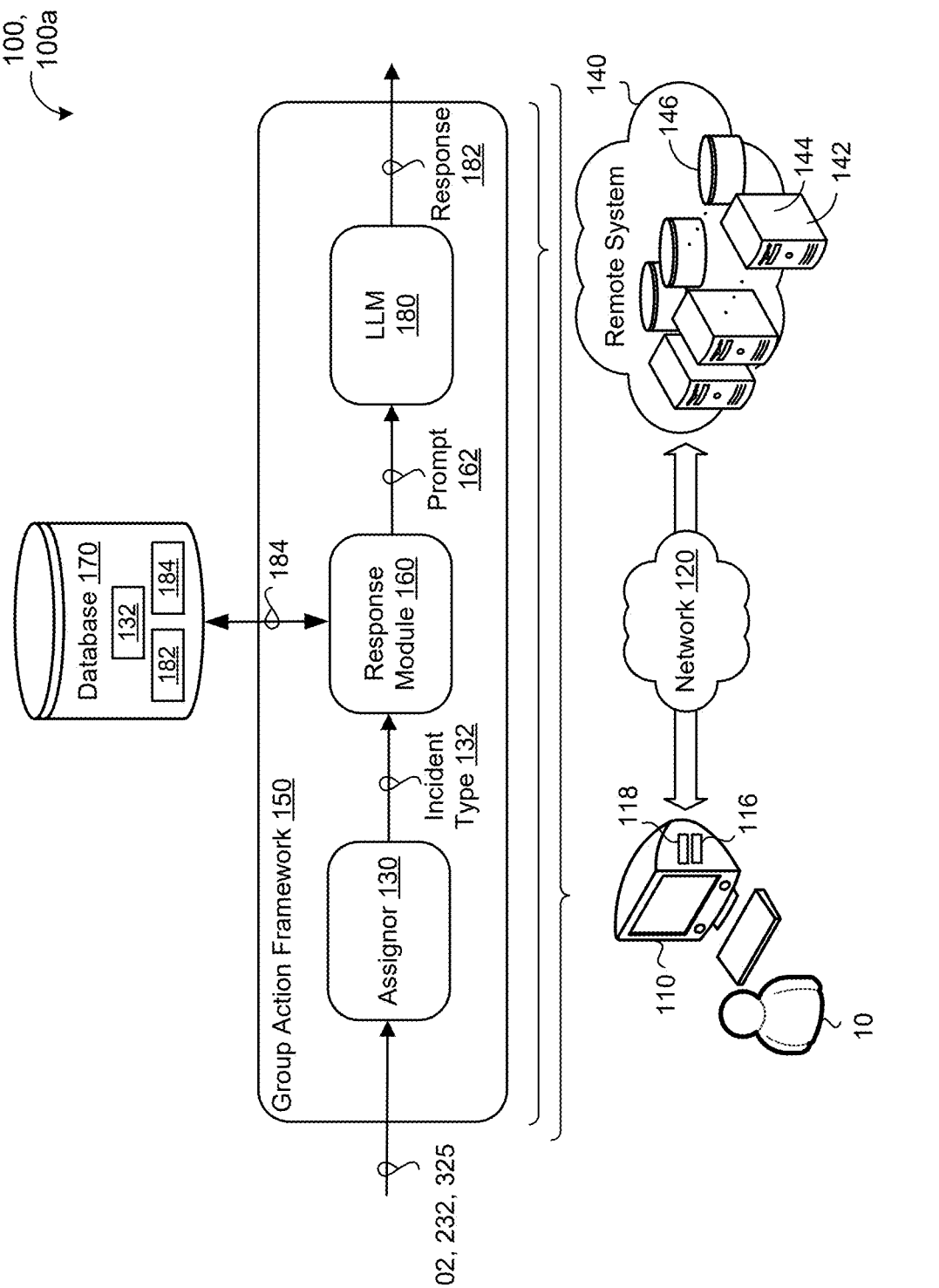
FIGS. 1A and 1B are schematic views of an example system using a group action framework.

The advent of large language models (LLMs) has revolutionized various industries by enabling users to send requests and receive actionable insights or responses. These models are commonly employed for tasks such as summarizing sentences, generating text, or responding to specific queries. Typically, these tasks are handled as isolated requests, providing quick and contextually relevant results. However, processing multiple related pieces of text through LLMs may significantly enhance the quality of the output. For instance, summarizing a series of interconnected events or synthesizing information from various documents may yield a more comprehensive and coherent response compared to handling each document in isolation. LLMs excel when provided with broader context, allowing them to identify patterns, relationships, and nuances that may not be evident in single requests. This approach not only results in more detailed outputs but also delivers more reliable and meaningful insights, thereby improving the overall utility of the responses generated by LLMs.

Moreover, existing solutions often struggle to manage diverse and complex data sets or to deliver customized, context-aware actions. For example, some organizations must identify and categorize similar or related documents and then execute specific actions on them, such as summarizing, resolving issues, making recommendations, or conducting analyses. Consequently, there is a technical challenge and a need for a system that supports multiple grouping methods and action outcomes, capable of automatically generating actionable recommendations based on the intended action and the type of data set.

Accordingly, implementations herein are directed towards a group action framework that obtains an incident report and assigns an incident type to the incident report. The group action framework also determines that the incident type has not been assigned to any prior incident reports and generates a prompt associated with the incident type based on determining that the incident type has not been assigned to any prior incident reports. The group action framework also generates a response to the incident report based on the prompt using a large language model.

Advantageously, the group action framework determines whether the incident type has not been received or not from any prior incident reports before querying the LLM to generate a response. To that end, the group action framework may only query the LLM to generate a response for incident reports when no prior incident reports with a similar incident type have already been used to query the LLM. For example, the group action framework may simply obtain a response stored in a database when the group action framework determines that a response for a similar incident report has already been generated by the LLM. This reduces the time and computational resources required to obtain the response. Moreover, in some configurations, the group action framework receives numerous incident reports such that the LLM is not capable of effectively processing all of the incident reports due to an input token limit of the LLM. As such, the group action framework may also assign each incident report into a group of incident reports and rank the incident reports within each group. Thereafter, the group action framework may process the incident reports based on the rankings within each group such that certain incident reports may be prioritized over other incident reports. This prioritization ensures that the LLM is able to process higher priority incident reports over lower priority incident reports.

Figure 1B:
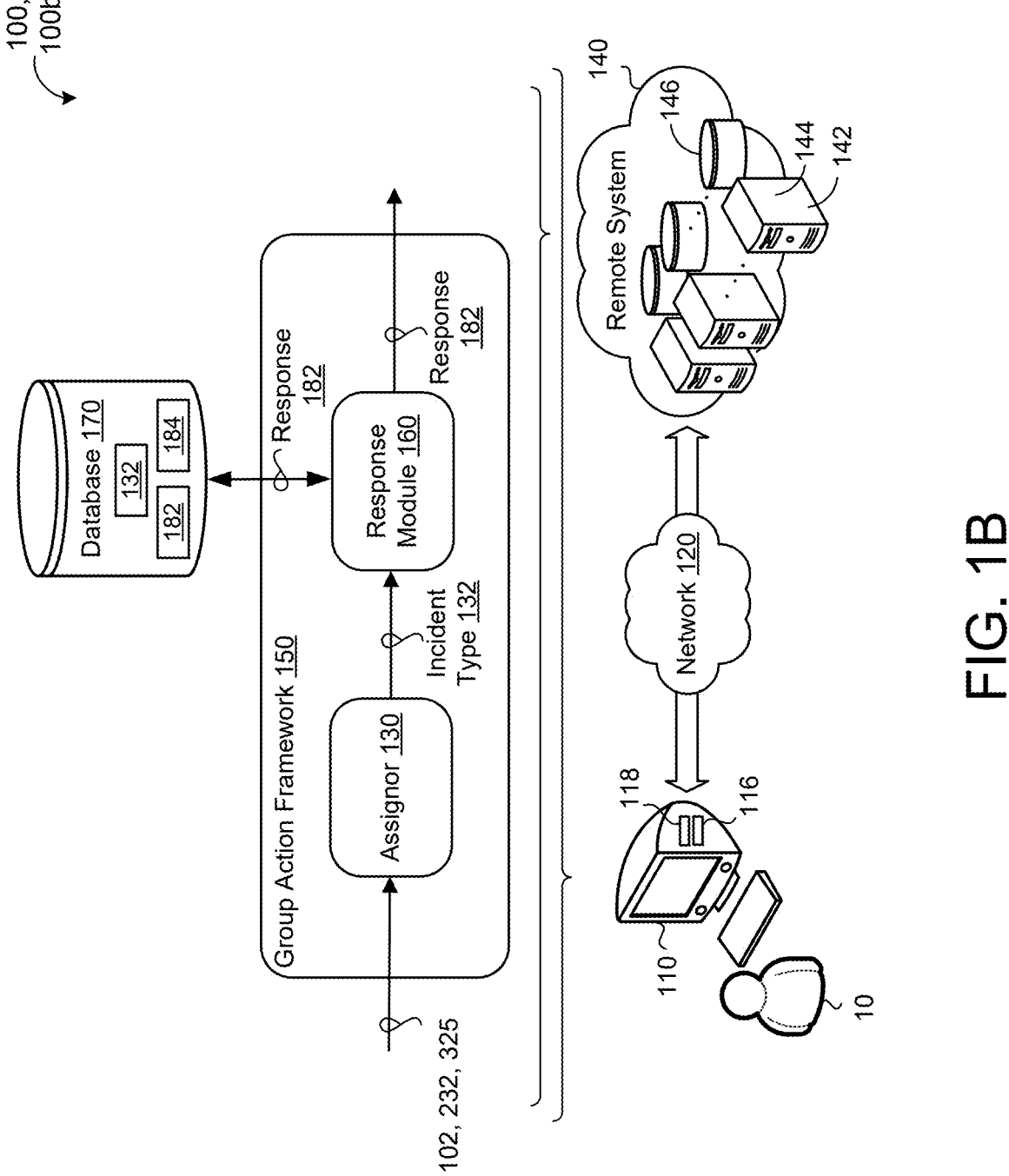

Referring to FIGS. 1A and 1B, in some implementations, a system 100 includes a remote system 140 in communication with one or more user device 110 each associated with a respective user 10 via a network 120, such as the Internet, a local area network (LAN), a wide area network (WAN), a cellular network, or a wireless network. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). The remote system 140 is configured to communicate with the user device 110 via the network 120. The user device 110 may correspond to any computing device, such as a desktop workstation, a laptop workstation, or a mobile device (i.e., a smart phone). Each user device 110 includes computing resources 116 (e.g., data processing hardware) and/or storage resources 118 (e.g., memory hardware).

The remote system 140 and/or the user device 110 may execute a group action framework 150. The group action framework 150 includes an assignor 130, a response module 160, and a large language model (LLM) 180. The assignor 130 may receive an incident report 102 from the user device 110 and/or the remote system 140. The incident report 102 may include any form of documentation of an event that disrupts the normal operation of information technology systems within an organization. As such, the incident report 102 may include data such as the date and time of the incident, a description of the event, the systems or services affected, and the impact on business operations. In some examples, the incident report 102 includes data characterizing a server crash that causes downtime of an organization's website, a cybersecurity breach where sensitive data is compromised, a network outage that disrupts communication over a communication network, or a software bug that leads to data corruption to name a few.

In other examples, the incident report 102 may include natural language text that characterizes an incident. That is, the user 10 may generate the incident report 102 by inputting natural language text to the user device 110 that describes a particular incident or issue the user 10 is experiencing. For instance, the user 10 may input natural language text explaining that they forgot a password or need to reset a password associated with the user 10. Alternatively, the incident report 102 may include natural language text generated by the user device 110 or the remote system 140 automatically characterizing an observed incident.

The assignor 130 assigns an incident type 132 from a plurality of different incident types 132 to the incident report 102. The assignor may assign the incident type 132 using any grouping technique, such as clustering, filtering, or querying. The assignor 130 may extract data from the incident report 102 to determine the incident type 132 for the incident report 102. The assigned incident type 132 indicates the class of incident of the incident report such that the incident report 102 may be grouped with one or more other similar incident reports 102. As such, the incident type 132 assigned to the incident report 102 may be shared with one or more other previously received incident reports 132 when the incident type 132 is similar to the one or more other previously received incident reports 102. On the other hand, the incident type 132 assigned to the incident report 102 may not be shared with other incident reports 102 when the incident type is unique from each other previously received incident report 102.

The response module 160 receives the incident type 132 from the assignor 130 and communicates with a database 170 to determine whether the incident type 132 has been assigned to any prior incident reports 102. The database 170 stores an association between previously assigned incident types 132 and the corresponding responses 182 generated for each incident type 132. Thus, by communicating with the database 170, the response module 160 may discern whether the group action framework 150 has already generated a response 182 for a prior incident report 102 with the same assigned incident type 132 or not. Advantageously, when the group action framework 150 has already generated a respective response 182 for a prior incident report 102 with the same assigned incident type 132, the response module 160 obtains the respective response 182 from the database 170 and outputs the respective response 182 without prompting the LLM 180. On the other hand, when the group action framework 150 has not generated a respective response 182 for a prior incident report 102 with the same assigned incident type 132, the response module 160 prompts the LLM 180 to generate a response 182 for the incident report 102. Each response 182 generated by the LLM 180 is responsive to the incident report 102 from which the response 182 was generated. That is, the response 182 may indicate or specify one or more next best actions in order to address the incident report. For example, the response 182 generated for an incident report 102 regarding a password reset may provide a sequence of actions for the user 10 to perform to reset their password. The group action framework 150 may communicate the response 182 to user device 110 over the network 120.

Referring now specifically to FIG. 1A, in some implementations, the response module 160 of a first example system 100, 100a communicates with the database 170 and determines that the incident type 132 assigned to the incident report has not been assigned to any prior incident reports 102 and generates a prompt 162 associated with the incident type 132 based on such determination. The response module 160 may determine that the incident type 132 has not been assigned to any prior incident reports 102 by determining that the database 170 lacks any response 182 associated with the incident type 132. The response module 160 may generate the prompt 162 based on the incident type 132 assigned to the incident report 102. For instance, an incident report 102 associated with a password reset incident may be assigned a corresponding incident type 132 indicating the password reset incident whereby the response module 160 generates the prompt 162 based on information of the password reset incident.

The prompt 162 may include natural language text that requests the LLM 180 to generate a corresponding response 182 that addresses the particular incident report 102. In some examples, the database 170 stores an association between each incident type 132 and a corresponding description 184 of the incident type 132 (discussed in greater detail with reference to FIG. 2A). In these examples, the response module 160 may obtain the description 184 of the incident type 132 assigned to the incident report 102 and generate the prompt 162 based on the description 184. Notably, since the description 184 may be generated based on one or more incident reports 102 assigned to the same incident type 132, generating the prompt 162 based on the description 184 may provide a more cohesive prompt 162 that elicits a more meaningful and insightful response 182 since the description 184 was generated from one or more related incident reports 102 rather than from a single incident report.

The LLM 180 receives the prompt 162 and generates a response 182 to the incident report 102 based on the prompt 162 generated by the response module 160. Thereafter, the group action framework 150 may store the response 182 generated by the LLM 180 for the incident report 102 at the database 170 in association with the incident type 132 assigned to the incident report 102 such that any subsequent incident reports 102 assigned the same incident type 132 may simply output the stored response 182 instead of using the LLM 180 to generate the response 182. In some examples, the group action framework 150 may obtain user feedback from the user 10 before storing the response in association with the incident type 132 to ensure that the response 182 actually addresses the incident report 102.

Referring now specifically to FIG. 1B, in some implementations, the response module 160 of a second example system 100, 100b communicates with the database 170 and determines that the incident type 132 assigned to the incident report 102 has been assigned to a particular prior incident report 102. Moreover, the response module 160 may identify a respective response 182 associated with the particular prior incident report 102 stored at the database 170. Here, the respective response 182 associated with the particular prior incident report 102 represents the response generated for the particular prior incident report 102 by the LLM 180. The response module 160 retrieves the response 182 stored at the database 170 and outputs the retrieved response 182 for the incident report 102. By retrieving the response 182 from the database 170 rather than requesting another response 182 from the LLM 180, the group action framework 150 reduces the amount of computing resources to generate the response 182 and reduces the response time in generating the response 182.

In some implementations, the group action framework 150 receives hundreds, thousands, or even hundreds of thousands of incident reports 102. Assigning incident types 132 to each incident report 102 when dealing with large input sizes or complex grouping methods (i.e., clustering) may be time-consuming and computing resource intensive. If this operation needs to be performed frequently, the grouping process itself may become a recurring bottleneck in the group action framework. For instance, if the group action framework 150 needs to cluster a large batch of documents every week, the group action framework 150 may encounter performance issues. Adding LLM-based action to the process may exacerbate the problem, as sending multiple requests to the LLM 180 for processing each incident report 102 or group of incident reports 102 may be even more time-consuming than the initial grouping or assignment step.

Sending numerous requests to the LLM 180 may lead to server crashes, slowdowns, or degraded performance, making the system less reliable and efficient. The challenge becomes more significant when handling large-scale operations, as frequent interactions with the LLM 180 can overwhelm the server, leading to potential downtime or poor response times. Moreover, as the complexity and size of the data (i.e., incident reports 102) increases, managing input token limits of the LLM 180 becomes a key bottleneck that may impact the effectiveness of LLMs 180. The effectiveness is particularly impacted when working with extensive documents or large volumes of related information, where exceeding the token limit degrades the quality of the output by the LLM 180.

Figures 2A, 2B:
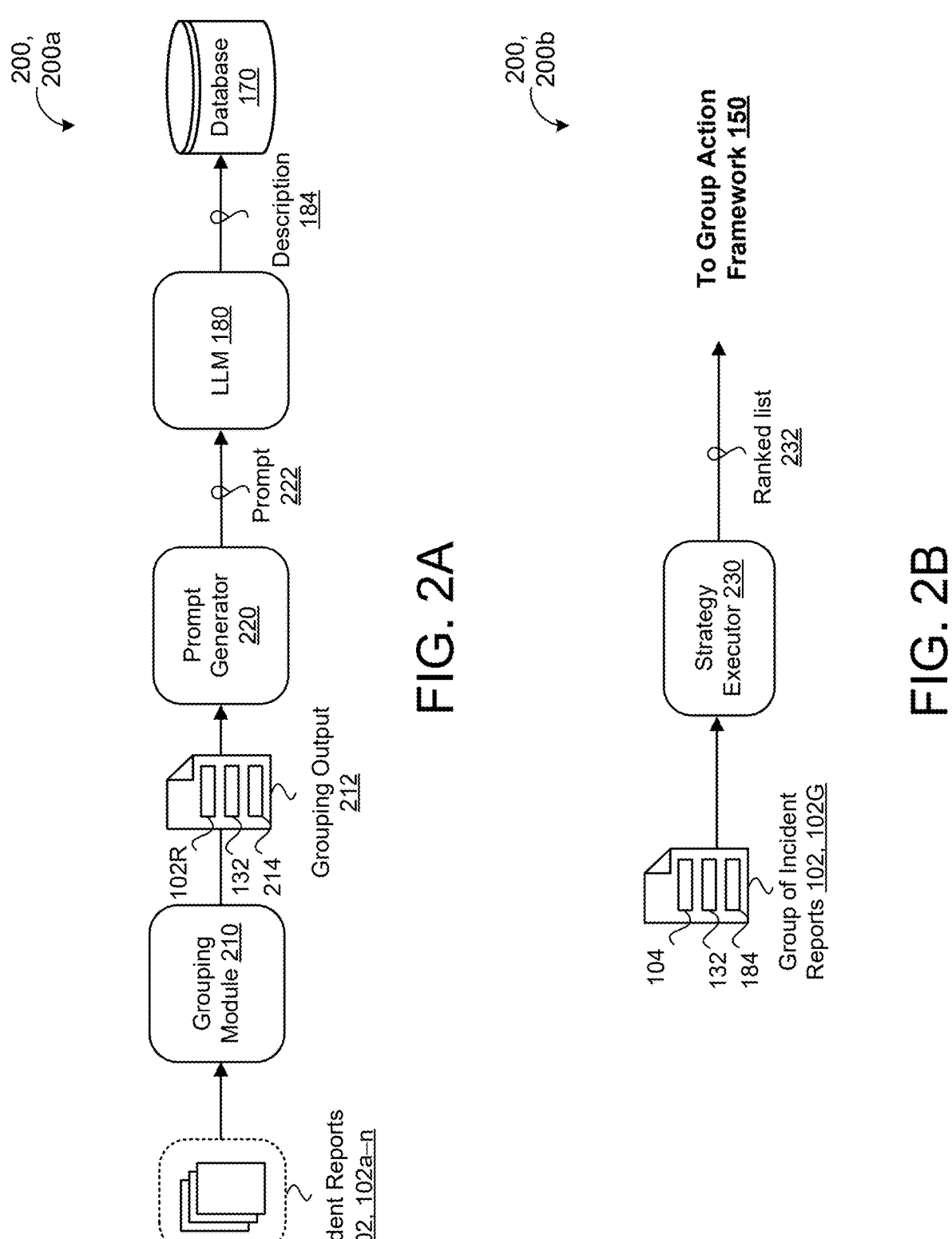
FIGS. 2A and 2B are schematic views of an example grouping process.

Accordingly, FIGS. 2A and 2B illustrate an example grouping process 200 of a plurality of incident reports 102. The example grouping process 200 includes a description generation component 200a (FIG. 2A) and a ranking component 200b (FIG. 2B). The grouping process 200 may be initiated in response to receiving a scheduled job request configured to execute at regular intervals. That is, the scheduled job may initiate the grouping process 200 to analyze any received incident reports 102 received since the last interval of the grouping process 200.

Referring now specifically to FIG. 2A, the description generation component 200a includes a grouping module 210, a prompt generator 220, and the LLM 180. The description generation component 200a is configured to generate a grouping output 212 for each of a plurality of incident reports 102, 102a-n a corresponding incident type 132 and generate a description 184 for each assigned incident type 132. For each respective incident report 102 of the plurality of incident reports 102, the grouping module 210 extracts data from the respective incident report and generates the grouping output 212 based on the extracted data. The grouping output 212 may include one or more of a corresponding incident type 132 of the respective incident report 102, one or more representative keywords 214 of the respective incident report 102, and/or one or more representative incident reports 102, 102R associated with the respective incident report 102.

The data extracted from each incident report 102 may include one or more record fields or values from the incident report and any clustering/grouping configurations. For instance, the record values may include natural language text characterizing the incident or a timestamp associated with the occurrence of the incident. The clustering or grouping configurations may be provided by the user associated with the incident report 102 and specify one or more particular record values from the incident report 102 for the grouping module 210 focus on when processing the incident report 102. The grouping module 210 may assign the corresponding incident type 132 to each respective incident report 102 using any grouping techniques, such as clustering, filtering, or querying. As such, the grouping module 210 may assign the corresponding incident type 132 in the same or similar manner as the assignor 130 (FIGS. 1A and 1B).

The grouping module 210 may generate the representative keywords 214 of the respective incident report 102 based on performing natural language understanding (NLU) or semantic interpretation of the incident report 102. Simply put, each of the representative keywords 214 includes one or more terms generally characterizing the assigned incident type 132. For example, for an incident report 102 regarding a networking connectivity issue, the grouping module 210 may generate a representative keyword 214 of "internet outage." Moreover, the representative incident reports 102R similar incident reports 102 previously seen by the group action framework 105 (FIGS. 1A and 1B) for which responses 182 were generated that resolved the similar incident reports 102. As such, the representative incident reports 102R may serve as example incident reports 102 for resolving the particular incident report the grouping module 210 is now processing.

For each respective incident report 102, the prompt generator 220 receives the grouping output 212 that corresponds to the respective incident report 102 and generates a descriptive prompt 222 based on the grouping output 212 (e.g., derived from the extracted data). The descriptive prompt 222 generated by the prompt generator 220 may request a respective description 184 (i.e., topic) of the respective incident report 102. The description 184 may be a sequence of terms (i.e., short sentence) that describes the topic of the respective incident report 102 or, more generally, the topic of the incident type 132 assigned to the respective incident report 102. As such, the description 184 may be shared by one or more incident reports 102 assigned to the same incident type 132. The LLM 180 processes the descriptive prompt 222 to generate the description for the respective incident report 102 or, more generally, the incident type 132 assigned to the respective incident report 102. For example, the LLM 180 may generate a respective description of "this incident report is associated with a password reset action" for a respective incident report 102 associated with a forgotten password. The description 184 may be stored in association with the incident type 132 at the database. As such, the description 184 may be leveraged by the response module 160 when generating the prompt 162 (FIG. 1A) for incident reports 102 assigned to the same incident type 132.

Referring now specifically to FIG. 2B, the ranking component 200b includes a strategy executor 230 that is configured to generate a ranked list of incident reports 232 for each assigned incident type 132. As described above, since the group action framework 150 may receive hundreds of thousands of incident reports 102 and the LLM 180 has input token limits, the group action framework 150 may become overloaded such that the group action framework 150 is unable to efficiently or effectively process each of the incident reports 102. To that end, the ranking component 200b is configured to generate the ranked list of incident reports 232 for each assigned incident type 132 such that the group action framework 150 may prioritize which incident reports 102 to process based on the ranked list of incident reports 232.

Thus, the strategy executor 230 may receive a group of incident reports 102, 102G. That is, the grouping process 200 may group each incident report 102 with one or more other incident reports 102 the same incident type 132. Moreover, each incident report 102 within the group of incident reports 102 may be associated with the same description 184 or a similar description 184 generated by the LLM 180. For example, each incident report 102 in the group of incident reports 102 may be assigned the incident type 132 regarding password reset may be associated with the description 184 of "this incident report is associated with a password reset action." In another example, a first incident report 102 in the group of incident reports 102 assigned the incident type 132 regarding password reset may be associated with the description 184 of "this incident report is associated with a password reset action" while a second incident report 102 in the group of incident reports 102 may be associated with the description 184 of "this incident report is associated with a forgotten password action." Notably, while the descriptions 184 are different, the same resolution action may apply to each of these incident reports 102.

Each incident report 102 includes a number of input tokens 104. Input tokens 104 are the fundamental units of data that the LLM 180 processes. Input tokens may represent words, subwords, or even individual characters, depending on the tokenization method used by the LLM 180. That is, the LLM 180 may break down each incident report 102 into input tokens 104 to better understand and analyze the content of the incident report 102. As such, the amount of content included in each incident report is directly related to the number of input tokens. In some implementations, the strategy executor 230 generates the ranked list of incident reports 232 for a respective group of incident reports 102G based on the number of input tokens 104 of each incident report 102 within the group of incident reports 102G.

The strategy executor 230 may rank the incident reports 102 within the group by prioritizing incident reports 102 with the least number of input tokens 104 over incident reports 102 with a greater number of input tokens 104. Prioritizing incident reports 102 with the least number of input tokens 104 ensures the LLM 180 may process a greater number of incident reports 102 from the group of incident reports 102G. Alternatively, the strategy executor 230 may rank the incident reports 102 within the group by prioritizing incident reports 102 with the greatest number of input tokens 104 over incident reports 102 with a lesser number of input tokens 104. Prioritizing incident reports with the greatest number of input tokens ensures the LLM 180 processes incident reports with the greatest number of input tokens 104 (i.e., incident reports with the most content) first. In some examples, the strategy executor 230 may further generate further groupings of the incident reports 102. That is, the strategy executor 230 may divide each incident report 102 within a group into a subgrouping and then rank each incident report 102 within each subgrouping. Thereafter, the strategy executor 230 outputs the ranked list of incident reports 232 for each group of incident reports 102G to the group action framework 150.

Figure 3:
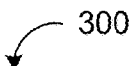
FIG. 3 is a schematic view of an example map reduce process.
Figure 3:
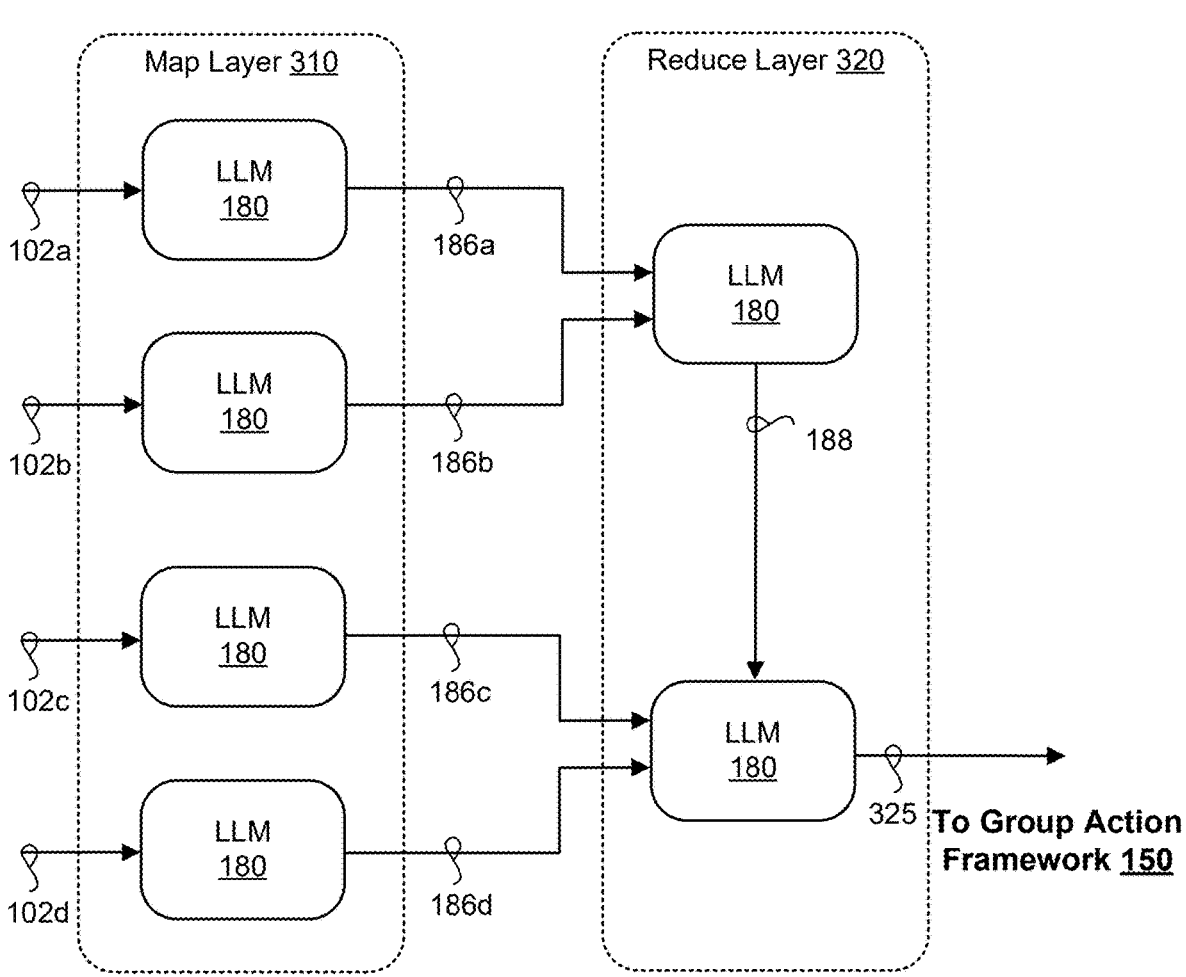

Referring now to FIG. 3, in some implementations, a map reduce process 300 in addition to, or in lieu of, generating the ranked list of incident report 232. That is, the map reduce process 300 may receive the ranked list of incident reports 232 or simply each group of incident reports 102G. The map reduce process 300 includes a map layer 310 and a reduce layer 320. The map layer 310 uses the LLM 180 to process each incident report 102 within the group to generate a respective output 186. Here, each respective output 186 represents a summary of the respective incident report 102. In the example shown, the map layer 310 receives four incident reports 102, 102a-d whereby the LLM 180 processes each respective incident report 102a-d to generate a respective output 186, 186a-d. In particular, the LLM 180 processes the first incident report 102a to generate a respective first output 186a that summarizes the first incident report 102a, the second incident report 102b to generate a respective second output 186b that summarizes the second incident report 102b, the third incident report 102c to generate a respective third output 186c that summarizes the third incident report 102c, and a fourth incident report 102d to generate a respective fourth output 186d that summarizes the fourth incident report 102d.

Thereafter, the reduce layer 320 groups (i.e., concatenates) one or more of the respective outputs 186 generated by the map layer 310 and use the LLM 180 to process each grouping. In the example shown, the reduce layer groups the first and second respective outputs 186a, 186b and the third and fourth respective outputs 186c, 186d by way of example only. That is, it is understood that the reduce layer 320 may apply any combination of groupings to the respective outputs 186 generated by the map layer 310. The reduce layer 320 uses the LLM 180 to process each grouping of respective outputs 186 to generate a reduction output 188. Continuing with the example shown, the LLM 180 processes the grouping of the first and second respective outputs 186a, 186b to generate the reduction output 188. The final grouping of outputs 186 is processed by the LLM 180 in addition to a preceding reduction output 188 to generate a summary 325. Thus, the summary 325 represents a single summary (i.e., a summary of all of the summaries) for all of the received incident reports 102.

In the example shown, the LLM 180 processes the grouping of the third and fourth respective outputs 186c, 186d and the reduction output 188 to generate the summary 325. Advantageously, the summary 325 summarizes each of the related incident reports 102 within the group of incident reports 102G such that the group action framework 150 may process the single summary 325 to generate a response 182 to each incident report 102 within the group rather than processing each incident report individually. Notably, since the summary 325 summarizes each of the respective outputs 186 (i.e., summaries) for each incident report, the summary 325 includes a lesser number of input tokens than the aggregate of the number of input tokens 104 of each incident report 102 within the group. This provides two distinct advantages, first, the summary 325 leverages richer context among the related incident reports 102 such that the LLM 180 may generate a more meaningful response 182 when processing the summary 325 in contrast to processing a single incident report 102. Second, the reduced number of input tokens of the summary 325 still enables the group action framework 150 to respond to each incident report 102 within the group while minimizing the number of input tokens processed by the LLM 180. This provides computational and latency efficiencies for the group action framework 150.

Referring back to FIGS. 1A and 1B, in some implementations, the group action framework receives the ranked list of incident reports 232 and/or the summary 325 of a group of incident reports 102 in addition to, or in lieu of, the single incident reports 102. This enables the group action framework 150 to optimize computational efficiency and latency provided by processing the summaries 325 or ranked list of incident report 232 as compared to processing the single incident reports 102.

Figure 4:
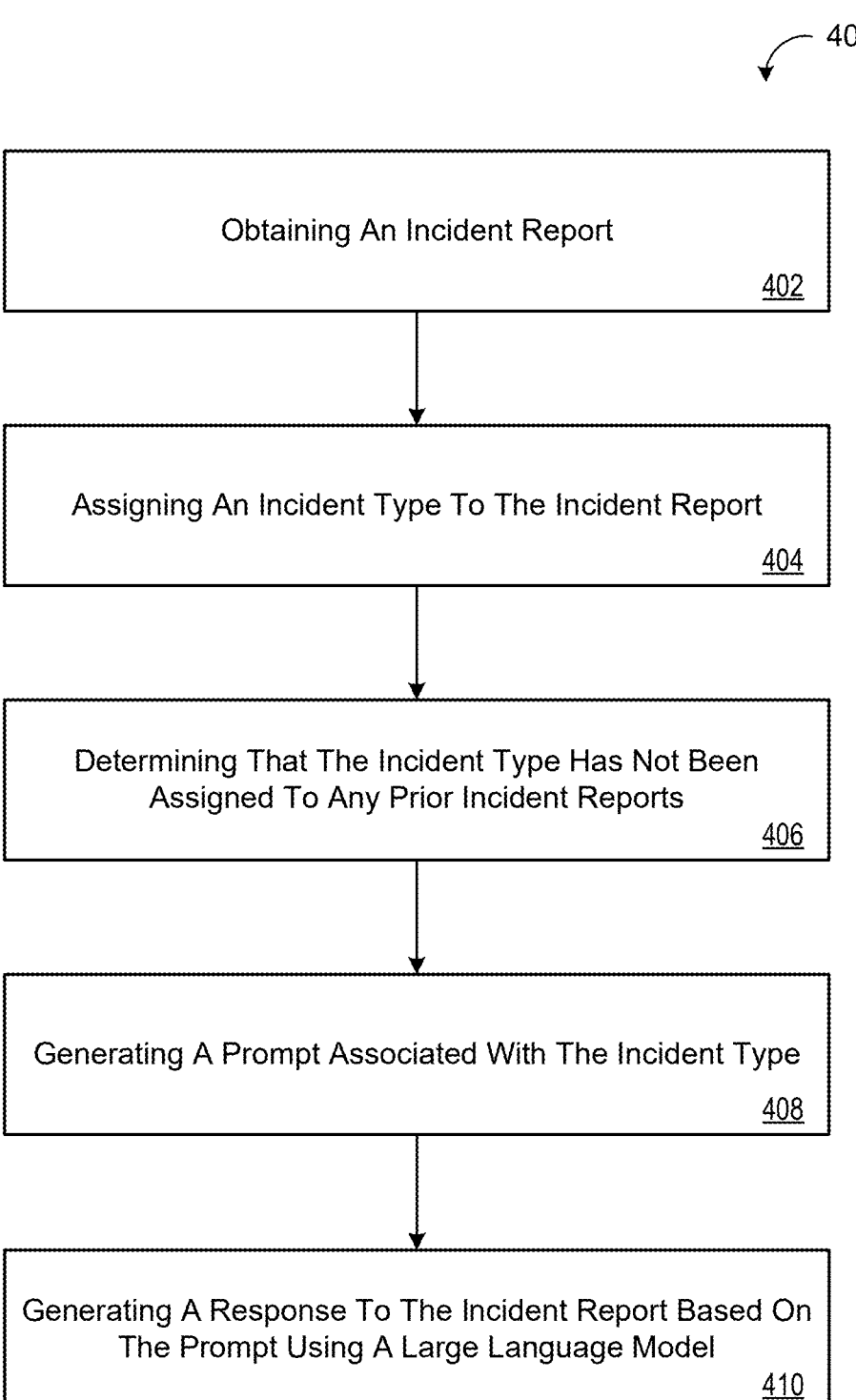
FIG. 4 is a flowchart of an example arrangement of operations for a computer-implemented method of using a group action framework.

FIG. 4 is a flowchart of an exemplary arrangement of operations for a computer-implemented method 400 of using a group action framework. At operation 402, the method 400 includes obtaining an incident report 102. At operation 404, the method 400 includes assigning an incident type 132 to the incident report 102. At operation 406, the method 400 includes determining that the incident type 132 has not been assigned to any prior incident reports 102. The method 400, at operation 408, includes generating a prompt 162 associated with the incident type 132 based on determining that the incident type 132 has not been assigned to any prior incident reports 102. At operation 410, the method 400 includes generating a response 182 to the incident report 102 based on the prompt 162 using a large language model (LLM) 180.

Accordingly, implementations herein (e.g., the method 400) address the technical challenge and a need for a system that supports multiple grouping methods and action outcomes, capable of automatically generating actionable recommendations based on the intended action and the type of data set. In particular, the group action framework 150 optimizes consumption of computing resources and latency in responding to incident reports 102 by only prompting the LLM 180 to generate a response 182 to incident reports when the group action framework 150 determines that the incident type 132 has not been assigned to any prior incident reports 102. Moreover, the implementations described herein optimize the consumption of computational resources and latency when responding to incident reports 102 by generating corresponding summaries 325 of groups of incident reports 102 rather than processing incident reports 102 on an individual basis and processing the ranked list of incident reports 232 to prioritize which incident reports 102 to process over other incident reports 102.

Figure 5:
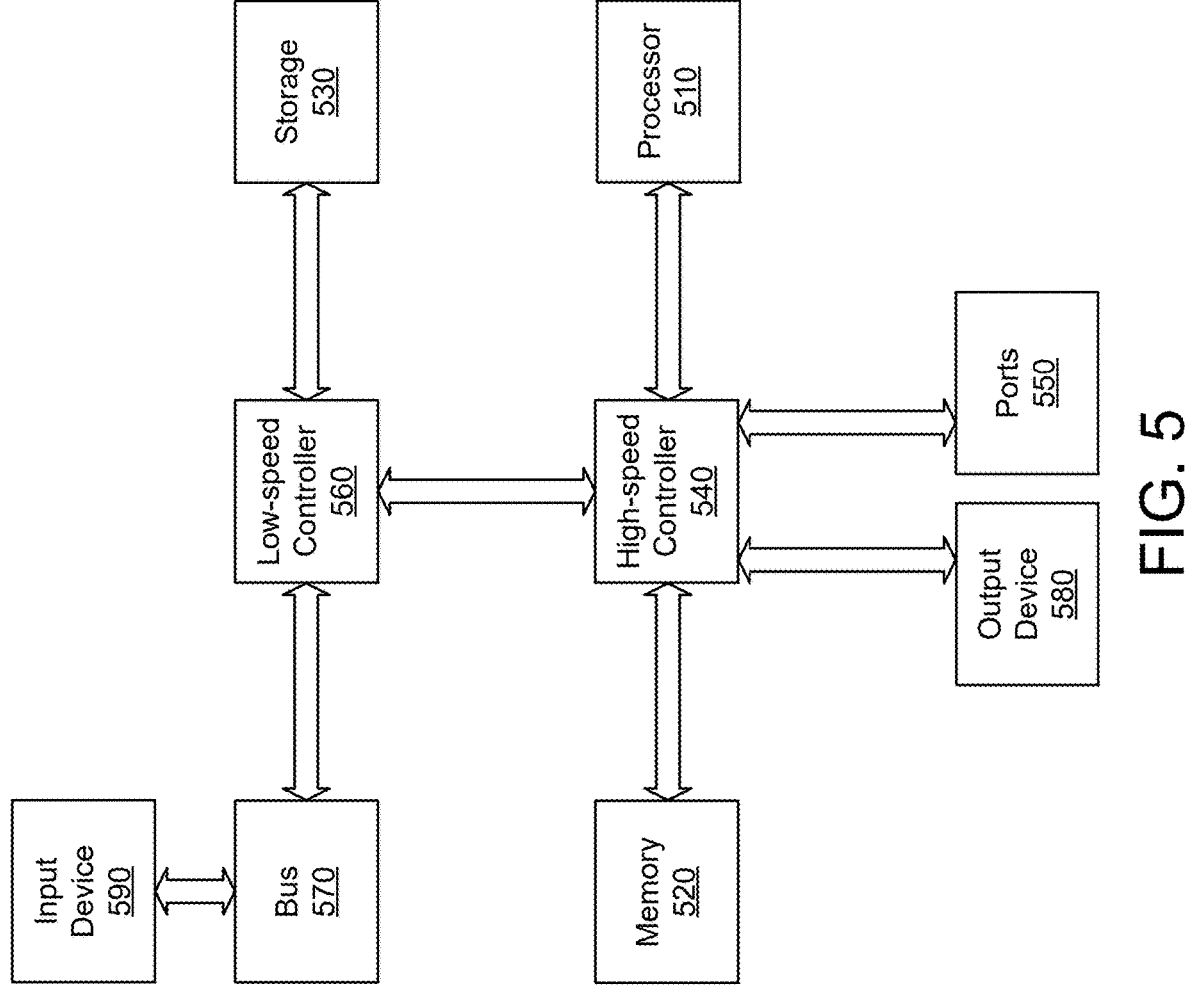
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, tablets, smartphones, servers, blade servers, mainframes, and other appropriate computers. The components shown here, their connections and relationships, and their functions, are meant to be illustrative only, and are not meant to limit implementations described and/or claimed in this document.

The computing device 500 includes a processor 510, memory 520, a storage device 530, a high-speed interface/controller 540 connecting to the memory 520 and high-speed expansion ports 550, and a low-speed interface/controller 560 connecting to a low-speed bus 570 and a storage device 530. Each of the components 510, 520, 530, 540, 550, and 560, are interconnected using various busses, and may be mounted on a common motherboard or in other manners as appropriate. The processor 510 can execute instructions for performing operations within the computing device 500, including instructions stored in the memory 520 or on the storage device 530 to display graphical information for a graphical user interface (GUI) on an external input/output device, such as display 580 coupled to high-speed interface 540. In other implementations, multiple processors and/or multiple buses may be used, as appropriate, along with multiple memories and types of memory. Also, multiple computing devices 500 may be connected, with each device providing portions of the necessary operations (e.g., as a server cluster, a group of blade servers, or a multi-processor system).

The memory 520 stores information within the computing device 500. The memory 520 may be a non-transitory computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs).

Examples of volatile memory include, but are not limited to, random access memory (RAM), dynamic random-access memory (DRAM), static random-access memory (SRAM), phase change memory (PCM) as well as disks or tapes.

The storage device 530 is capable of providing mass storage for the computing device 500. In some implementations, the storage device 530 is a non-transitory computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is embodied in a non-transitory information carrier. The computer program product contains instructions that, when executed, perform one or more methods, such as those described above. The information carrier is a non-transitory computer-readable medium, such as the memory 520, the storage device 530, or memory on processor 510.

The high-speed controller 540 manages bandwidth-intensive operations for the computing device 500, while the low-speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port or input device 590. The low-speed expansion port 590, which may include various communication ports (e.g., USB, Bluetooth, Ethernet, wireless Ethernet), may be coupled to one or more input/output devices, such as a keyboard, a pointing device, a microphone, a touch screen, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the term "non-transitory computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory computer-readable medium that receives machine instructions as a non-transitory computer-readable signal. The term "non-transitory computer-readable signal" refers to any signal used to provide machine instructions and/or data to a programmable processor.

A software application (i.e., a software resource) may refer to computer software that instructs a computing device to perform a specific function or set of functions. A software application may be executed by a processor, a virtual machine, a web browser, or another software component on the computing device. In some examples, a software application may be referred to as an "application," an "app," a "program," or a "service." Example applications include, but are not limited to, system diagnostic applications, system management applications, system maintenance applications, word processing applications, spreadsheet applications, messaging applications, media streaming applications, social networking applications, gaming applications, e-commerce applications, cloud computing applications, artificial intelligence applications, and blockchain applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a non-volatile memory or a volatile memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Non-transitory computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more implementations of the disclosure can be implemented on a computer having a display device, e.g., a LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
obtaining an incident report;
assigning an incident type to the incident report;
generating a group of incident reports comprising the incident report and one or more other incident reports assigned to the incident type;
querying a database that stores associations between previously assigned incident types and corresponding responses previously generated by a large language model (LLM), each corresponding response specifying one or more actions to resolve the previously assigned incident type;
based on querying the database, determining that the database lacks a previously generated response by the LLM associated with the assigned incident type;

generating, using the LLM, a summary of the group of incident reports;
based on the summary and determining that the database lacks the previously generated response by the LLM associated with the assigned incident type, generating a prompt associated with the incident type; and
generating, using the LLM, a response to the incident report based on the prompt.

2. The method of claim 1, further comprising storing the response for the incident report at the database.

3. The method of claim 1, further comprising:
obtaining a second incident report; and
assigning a second incident type to the second incident report.

4. The method of claim 3, further comprising:
determining that the second incident type has been assigned to a particular prior incident report;
based on determining that the second incident type has been assigned to the particular prior incident report, identifying a second response stored at the database, the second response associated with the second incident type; and
retrieving the second response for the second incident report.

5. The method of claim 4, wherein the second response was previously generated by the LLM based on the particular prior incident report.

6. The method of claim 1, further comprising extracting data from the incident report.

7. The method of claim 6, further comprising determining one or more representative keywords for the incident report based on the extracted data.

8. The method of claim 6, further comprising determining one or more representative incident reports based on the extracted data.

9. The method of claim 6, further comprising:
generating a descriptive prompt based on the extracted data; and
generating, using the LLM, a description for the incident report based on the descriptive prompt.

10. The method of claim 1, further comprising generating a ranked list of incident reports for the group of incident reports based on a number of input tokens of each incident report within the group of incident reports.

11. The method of claim 10, the ranked list prioritizes a first incident report with a lower number of input tokens over a second incident report with a higher number of input tokens.

12. The method of claim 11, wherein generating the response to the incident report comprises selecting the incident report from the group of incident reports based on the ranked list.

13. The method of claim 10, further comprising:
for each incident report in the group of incident reports, generating, using the LLM, a respective output; and
generating, using the LLM, the incident report summary based on the respective output generated for each incident report.

14. A system comprising:
data processing hardware; and
memory hardware in communication with the data processing hardware, the memory hardware storing instructions that when executed on the data processing hardware cause the data processing hardware to perform operations comprising:
obtaining an incident report;
assigning an incident type to the incident report;

generating a group of incident reports comprising the incident report and one or more other incident reports assigned to the incident type;

querying a database that stores associations between previously assigned incident types and corresponding responses previously generated by a large language model (LLM), each corresponding response specifying one or more actions to resolve the previously assigned incident type;

based on querying the database, determining that the database lacks a previously generated response by the LLM associated with the assigned incident type;

generating, using the LLM, a summary of the group of incident reports;

based on the summary and determining that the database lacks the stored previously generated response by the LLM associated with the assigned incident type, generating a prompt associated with the incident type; and generating, using the LLM, a response to the incident report based on the prompt.

15. The system of claim 14, wherein the operations further comprise extracting data from the incident report.

16. The system of claim 15, wherein the operations further comprise determining one or more representative keywords for the incident report based on the extracted data.

17. The system of claim 15, wherein the operations further comprise determining one or more representative incident reports based on the extracted data.

18. The system of claim 15, wherein the operations further comprise:

generating a descriptive prompt based on the extracted data; and generating, using the LLM, a description for the incident report based on the descriptive prompt.

19. A non-transitory computer-readable medium having instructions that, when executed by data processing hardware, cause the data processing hardware to perform operations comprising:

obtaining an incident report;

assigning an incident type to the incident report;

generating a group of incident reports comprising the incident report and one or more other incident reports assigned to the incident type;

querying a database that stores associations between previously assigned incident types and corresponding responses previously generated by a large language model (LLM), each corresponding response specifying one or more actions to resolve the previously assigned incident type;

based on querying the database, determining that the database lacks a previously generated response by the LLM associated with the assigned incident type;

generating, using the LLM, a summary of the group of incident reports;

based on the summary and determining that the database lacks the previously generated response by the LLM associated with the assigned incident type, generating a prompt associated with the incident type; and generating, using the LLM, a response to the incident report based on the prompt.

* * * * *